(12) United States Patent
Servel

(10) Patent No.: US 7,791,331 B2
(45) Date of Patent: Sep. 7, 2010

(54) USE OF MAGNETO-IMPEDANCE ON A CONTACTLESS POSITION SENSOR AND CORRESPONDING SENSOR

(75) Inventor: Eric Servel, Roques sur Garonne (FR)

(73) Assignee: Continental Automotive France, Toulouse (FR)

( * ) Notice: Subject to any disclaimer, the term of this patent is extended or adjusted under 35 U.S.C. 154(b) by 114 days.

(21) Appl. No.: 11/883,529

(22) PCT Filed: Feb. 3, 2006

(86) PCT No.: PCT/EP2006/000936

§ 371 (c)(1),
(2), (4) Date: Aug. 1, 2007

(87) PCT Pub. No.: WO2006/084632

PCT Pub. Date: Aug. 17, 2006

(65) Prior Publication Data

US 2008/0164868 A1    Jul. 10, 2008

(30) Foreign Application Priority Data

Feb. 8, 2005    (FR) .................................. 05 01236

(51) Int. Cl.
*G01B 7/14*    (2006.01)

(52) U.S. Cl. ................................................ 324/207.13
(58) Field of Classification Search ............ 324/207.21, 324/207.24, 207.13, 235, 207.22, 207.25
See application file for complete search history.

(56) References Cited

U.S. PATENT DOCUMENTS

| 5,502,380 A | 3/1996 | Sittler et al. |
| 6,401,883 B1 | 6/2002 | Nyce et al. |
| 7,345,471 B2 * | 3/2008 | Sellen et al. ............ 324/207.12 |
| 2004/0017187 A1 | 1/2004 | Van Ostrand et al. |

FOREIGN PATENT DOCUMENTS

| FR | 2 803 030 A1 | 6/2001 |
| JP | 61239922 | * 10/1986 |

* cited by examiner

*Primary Examiner*—Reena Aurora
(74) *Attorney, Agent, or Firm*—Young & Thompson

(57) ABSTRACT

According to the intended use, an electrical conductor (1) having a magnetically sensitive surface (10) subjected to the magnetic force of a permanent magnet (11) is produced, the area of this surface varying according to its relative position with respect to the magnet, said relative position between the magnet and the magnetically sensitive surface is varied, which causes at least one physical characteristic of this conductor, to vary, and said variation in physical characteristic(s) of the electrical conductor is recorded, this variation being in correlation with the position of the magnet (11).

20 Claims, 4 Drawing Sheets

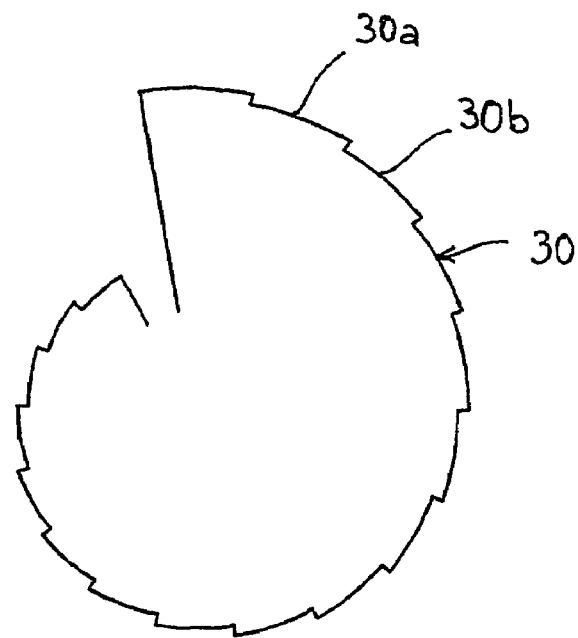
Figure 7
Figure 8
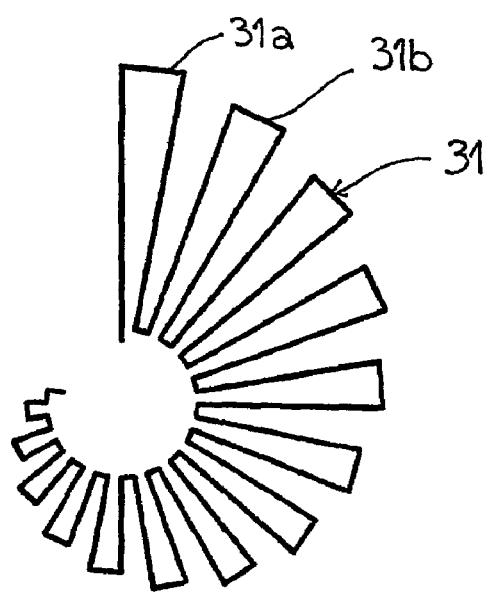

USE OF MAGNETO-IMPEDANCE ON A CONTACTLESS POSITION SENSOR AND CORRESPONDING SENSOR

BACKGROUND OF THE INVENTION

The invention relates to the application of magnetoimpedance, also called here RMS (resistive magnetic saturation), in the field of sensors.

More precisely, the invention relates here to the use of this magnetoimpedance on a contactless position sensor, and to the sensor itself.

The physical phenomenon involved here is, in general, the following:

an electrical conductor through which an AC electrical current flows sees this current distributed around the periphery of the conductor.

This phenomenon is commonly called the skin effect.
The depth of this skin is determined by the formula:

$$\delta = \sqrt{\frac{\rho}{\pi \mu_0 \mu_r f}}$$

where:
   $\delta$ is the skin depth;
   $\rho$ is the resistivity of the conductor in ohms.meter;
   $\mu_0$ is the magnetic permeability of free space ($4\pi \times 10^{-7}$);
   $\mu_r$ is the magnetic permeability of the material; and
   f is the frequency in hertz.

Thus, the more the frequency f increases, the more the skin depth $\delta$ decreases.

Moreover, the electrical resistance of an electrical conductor is given by the formula:

$$R = \frac{\rho L}{A}$$

where:
   R is the resistance of the conductor in ohms;
   $\rho$ is the resistivity of the conductor in ohms.meter;
   L is the length of the conductor in meters; and
   A is the cross-sectional area of the conductor.

It should be noted that, in such a skin effect phenomenon, when the frequency f increases for a given electrical conductor (all other things being equal) the area A decreases and therefore the measured resistance R greatly increases.

If a magnetic field is applied to the electrical conductor made of an appropriate material, this modifies the magnetic permeability ($\mu_r$) of the material.

This has the effect of making the measured resistance R drop compared with the same conductor not subjected to the external magnetic field in question.

This phenomenon has already been used to measure, typically with great precision, absolute magnetic fields, and sensors operating on the principle of magnetoimpedance, and especially on giant magnetoimpedance, have been developed. They operate at very high frequencies (greater than 1 GHz in the case of giant magnetoimpedance) and in particular use amorphous materials for forming the electrical conductor serving as sensitive element.

The problem posed here is that of how to widen the field of application of magnetoimpedance, on the basis of the above-mentioned physical phenomenon, without necessarily having to measure very precisely the magnetic fields in question and without necessarily incurring the high costs imposed hitherto, in particular in the case of the aforementioned sensors, especially those developed in relation to giant magnetoimpedance.

SUMMARY OF THE INVENTION

It is within this context that it is proposed here to use this phenomenon of magnetoimpedance on a contactless position sensor, having the particular feature that:

a) an electrical conductor having a magnetically sensitive surface subjected to the magnetic effect of a permanent magnet is produced, the area of this surface varying according to its relative position with respect to the magnet;

b) said relative position between the magnet and the magnetically sensitive surface of the electrical conductor is varied, which causes at least one physical characteristic of this conductor to vary; and c) said variation in physical characteristic(s) of the electrical conductor obtained during step b) is recorded, this variation being in correlation with the position of the magnet.

Thus, the phenomenon of magnetoimpedance may be applied, especially in the automotive industry field, where the application conditions are different from those of the known prior sensors.

Preferably, during steps b) and c), the physical characteristic of the electrical conductor that varies, and which is recorded, is the electrical resistance of this conductor.

Specifically, this electrical resistance is modified by the variation in relative position between the magnet and the magnetically sensitive surface of the electrical conductor and recording this resistance is an easy and low-cost procedure, the more so as it is unnecessary for the recording to be of high precision.

Since the choice of using magnetoimpedance for producing such a position sensor is especially an economic one and since the objective of the present approach is not to result in an exact quantitative measurement, it is recommended that, during step b), the electrical conductor is subjected to an AC voltage alternating between a few kilohertz and at least around one hundred megahertz.

Although the effect produced by applying such a range of frequencies is smaller than in the case of the frequencies already known (above 1 GHz in the case of giant magnetoimpedance), this effect nevertheless remains quite sufficient to be detectable with the type of sensor concerned here.

As regards obtaining the variable surface area on the electrical conductor, it should now be noted that one or other of the following variants is recommended:

either this variable surface area is obtained by varying the cross section of the electrical conductor;
   or this surface area is obtained by varying the density of the electrical conductor subjected to the magnetic effect of the magnet.

The term "density" should be understood to mean the length of the segments (assumed to be of constant cross section) of the electrical conductor seen by the magnet in operation.

For example, the density will be higher if the magnet is moved facing three segments close together than if the same magnet, for the same displacement and for the same length of segments, sees only two segments spaced further apart.

Thus, the surface of the electrical conductor subjected to its magnetic field can vary according to the position of movement of the magnet, even if the cross section of the conductor remains constant.

It should be made clear that the relative displacement referred to between the magnet and the electrical conductor may in particular be a translation or a rotation.

In the latter case, it is proposed in particular, to meet the low-cost, effectiveness and reliability objectives, that:
- during step a), the conductor is wound so that it has, around the outside, segments developing along substantially a spiral; and
- during step b), a relative rotation between the magnet and this spiral, which are facing each other, is imposed.

Apart from the use of the magnetoimpedance phenomenon as presented, the invention therefore applies to a position sensor as such, and in particular to a position sensor for a motor vehicle, comprising:
- a conducting track area having a surface sensitive to the magnetic field of a magnet, physical characteristics and terminals;
- a permanent magnet for generating said magnetic field on the sensitive surface;
- a power source for creating an AC voltage across said terminals of the conducting track area;
- displacement means for making the relative position between the magnet and the sensitive surface vary; and
- recording means for recording a variation in at least one of the physical characteristics of the conducting track area generated by said variation in relative position.

As already indicated, it is recommended that the recording means comprise means for recording the electrical resistance or the variation in electrical resistance of said conducting track area.

To meet the intended objectives of competitive cost, reliability and effectiveness, it is also recommended that the electrical conductor comprise or consist of (at least in its sensitive area) a paramagnetic material or a ferromagnetic material.

Moreover, to further enhance the effectiveness of the sensor, or even its sensitivity, it is furthermore recommended that:
- the magnet be movable with respect to the sensitive surface on a displacement direction; and
- the conducting track area have, predominantly or exclusively, conducting track portions that are not perpendicular to the direction of displacement of the magnet.

For a similar objective, and complementarily or alternatively, it is proposed that the magnet be provided with pole pieces for concentrating the magnetic field.

BRIEF DESCRIPTION OF THE DRAWINGS

In the even more detailed description that follows, the figures illustrate exemplary embodiments in which:

FIGS. 3, 4, 5, 6, 7 and 8 show various geometries of electrical conductors (also called, above, conducting track areas).

DETAILED DESCRIPTION OF THE PREFERRED EMBODIMENTS

Figure 1:
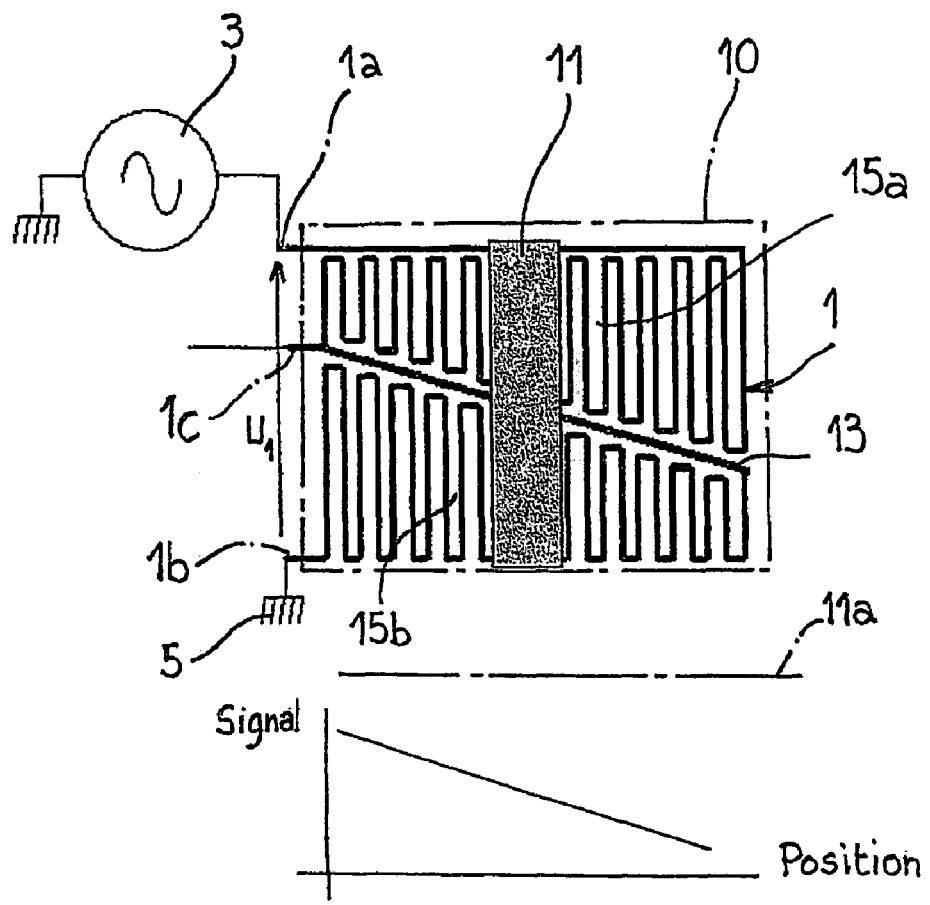
FIG. 1 shows schematically an example of contactless position sensor according to the invention, designed on the abovementioned basis of magnetoimpedance.

The object of the approach here is therefore a priori not to make an exact quantitative measurement (a measurement of the external magnetic field as was the case with GMI sensors).

In what follows, it will be moreover considered that the physical characteristic of the electrical conductor 1, in the sensitive area 10 subjected to the effect of the magnet, which has to vary in order to allow the magnetoimpedance (or RMS) phenomenon to be used, is the impedance, and in particular the resistance R, of this conductor at the stimulation frequency.

Before specifically dealing with the figures, it should also be noted that the position sensor of the invention, therefore favorably based on the variation in resistance R of an electrical conductor, in particular made of a paramagnetic or ferromagnetic material, and subjected to an AC voltage of frequency f, is in general described as follows:
- a permanent magnet, generating a known magnetic field, is moved opposite the electrical conductor in question;
- it "disturbs" and partially or completely eliminates the skin effect occurring in its affected area;
- the resistance R of the conductor is therefore modified; and
- measuring this resistance allows the position of the magnet to be located.

However, this is possible, for a given electrical conductor, only if its shape, and therefore the area of the surface subjected to the effect of the magnet, varies according to the position of this magnet. Thus, a linear conductor will have, locally, a resistance that varies under the effect of the magnetic field produced by the permanent magnet, but from an overall standpoint its resistance will be constant, even if it is much less than that measured in the absence of the magnet.

By making a conductor from a suitable material, and with an area of the surface subjected to the effect of the magnet that varies with the position of this magnet, the latter will mask different areas and the total resistance of the conductor will vary.

This may be favorably achieved in various ways. In particular:
- by varying the cross section of the conductor. This can be achieved easily with a conductor fastened to the PCB (printed circuit board) for example. It suffices to produce tracks (constituting the conductor) of different widths and the desired effect is obtained, and/or to vary the density of conductors subjected to the magnet. Taking the above example of a conducting track etched on a PCB, it suffices for example to produce loops or "meanders" of greater or lesser spacing in order to achieve the result.

For economic and effectiveness/cost ratio reasons, amorphous materials, which are very expensive, may advantageously be replaced with ferromagnetic materials such as for example µ-metal®. This allows the use of a low-cost magnet, but nevertheless excellent results are obtained. Thus, a film of µ-metal® may be applied to a PCB. The tracks are then etched.

Now, µ-metal® is a soft magnetic alloy having a crystalline structure that is relatively stable considering the various treatments occurring during its manufacturing process, and good thermal conductivity. It is an alloy based on nickel and iron (77% Ni, 14% Fe, 5% Cu and 4% Mo for example).

Permalloy® is another brand name of a known magnetic alloy that can be used, but other materials are available. For example, iron could be used, but it would then be necessary to modify the operating frequencies of the AC current associated with the sensor so as to achieve better performance.

FIG. 1 shows an electrical conductor 1 supplied by an alternating supply voltage, such as a source 3 of AC power, and grounded at 5.

An alternating input voltage $U_1$ may then be applied between the terminals 1a, 1b of the conductor 1.

In particular for a conductor 1 made of paramagnetic or ferromagnetic material, the frequency of this voltage $U_1$ will be between a few hundred Hz and less than one thousand MHz, advantageously between a few kHz and less than 100 MHz, and even more advantageously (for these materials) between 5 kHz and 50 MHz.

At the output (terminal 1c), the electrical conductor 1 may be connected to a voltmeter for measuring the amplitude of the output signal.

It will be possible to use an amplitude-modulated AC voltage source for further facilitating the electronics for measuring the output voltage as a function of the variation in resistance of the sensitive element.

The electrical conductor 1 defines an area 10 of conducting tracks, also called resistive tracks, constituting the sensitive part of the sensor with, at the point where the conductor passes, a magnetically sensitive surface (bounded by the outline 10) subjected to the magnetic effect of a permanent magnet 11 placed facing it.

Figure 2:
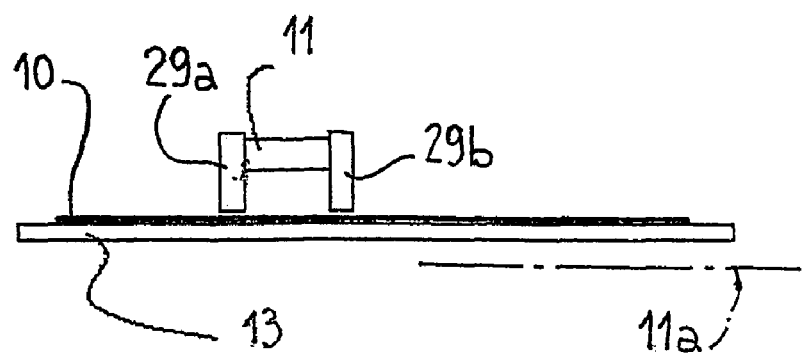
FIG. 2 shows a side view of a position sensor with a magnet provided with pole pieces.

As shown in FIG. 2, the conducting track area 10 may in particular be formed on a support substrate usually called a PCB (printed circuit board) commonly used for the production of electronic cards.

Facing these resistive tracks is the magnet 11 which, in FIGS. 1 and 2, can move translationally along a direction 11a parallel to the elongation direction of the tracks.

In the case of FIG. 1 (but this is applicable to the other resistive track geometries shown in FIGS. 3 to 8), this sensitive conducting element may be used in the manner in which a potentiometer would be used. However, it might be preferable to use a Wheastone bridge or one of its variants, or even other known means. Given the geometry of the conductor in the area 10, it is the voltage ratio $U_3/U_4$ that will vary depending on the position of the magnet 11, $U_3$ and $U_4$ being the AC voltages between the terminals 1a, 1c and 1b, 1c respectively.

Figure 3:
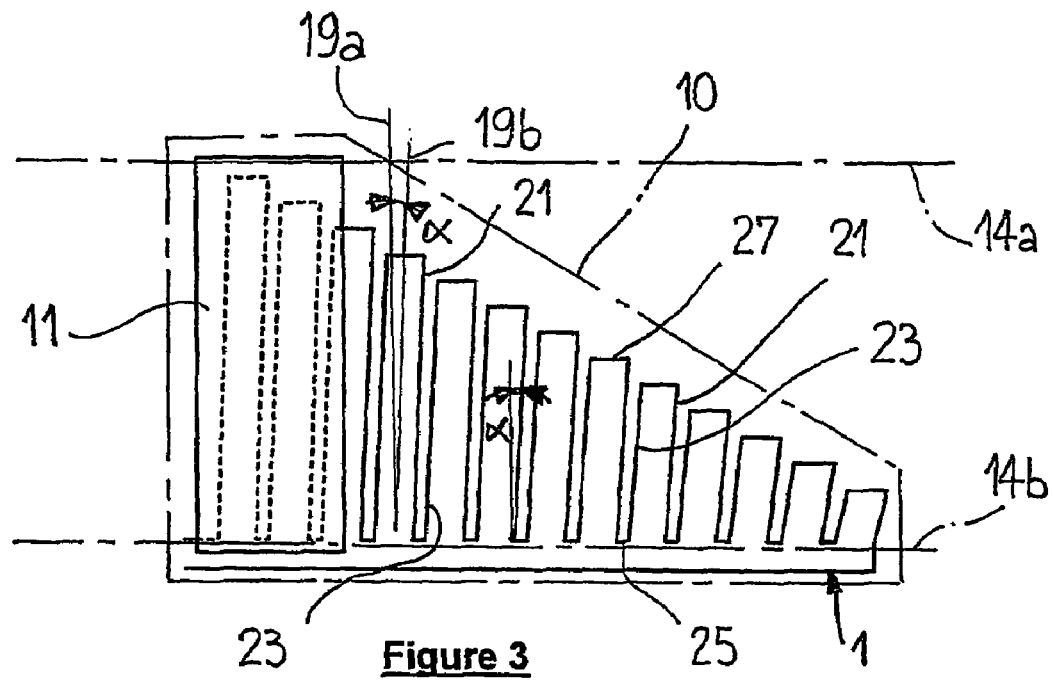

In FIG. 1, but also in FIG. 3, the movable magnet 11 extends over the entire width of the resistive track area 10 so as to make a sensitive surface as wide as possible.

The relative movement between the magnet and the sensitive area of the electrical conductor 1 may be generated by any appropriate member, or group of members, such as for example a motor shaft, a camshaft, a crankshaft (of an automobile engine), or else the clutch, the suspension, etc.

Figure 6:
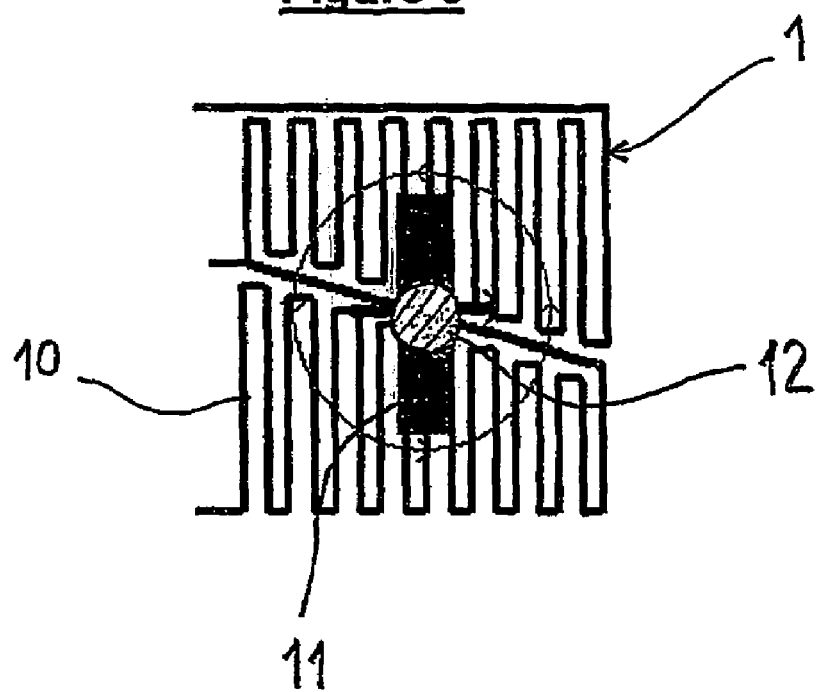

FIG. 6 shows schematically one end of a motor shaft 12 for rotating the magnet 11, which is fastened to a free end.

In FIGS. 1 and 3 to 5, where the movement of the magnet is (or comprises) a translation, slideways can guide and orient this transverse displacement along the direction 11a (see the dotted lines 14a and 14b in FIG. 3).

It should be noted that the electrical conductor 1 typically has, in its central part, an essentially linear segment 13 having a slope inclined very little to 11a and extending over the length L of the sensitive area 10, so that, in this area, the electrical conductor 10 has, on either side of this essentially linear central linking segment, and therefore on either side of the central axis 11a, two (approximately) similar areas 15a, 15b, which are made up of crenellated or meandering segments, respectively increasing and decreasing, in one direction and in the opposite direction, along the axis 11a, and defining substantially two opposed triangular areas. The terminal 1c is at one end of the segment 13 (FIG. 1).

Again in FIG. 1, this segment is linear. The alternating output signal $U_2$ will therefore change with a constant slope, if the magnet moves along 11a, as shown by the curve at the bottom of this FIG. 1.

Figure 4:
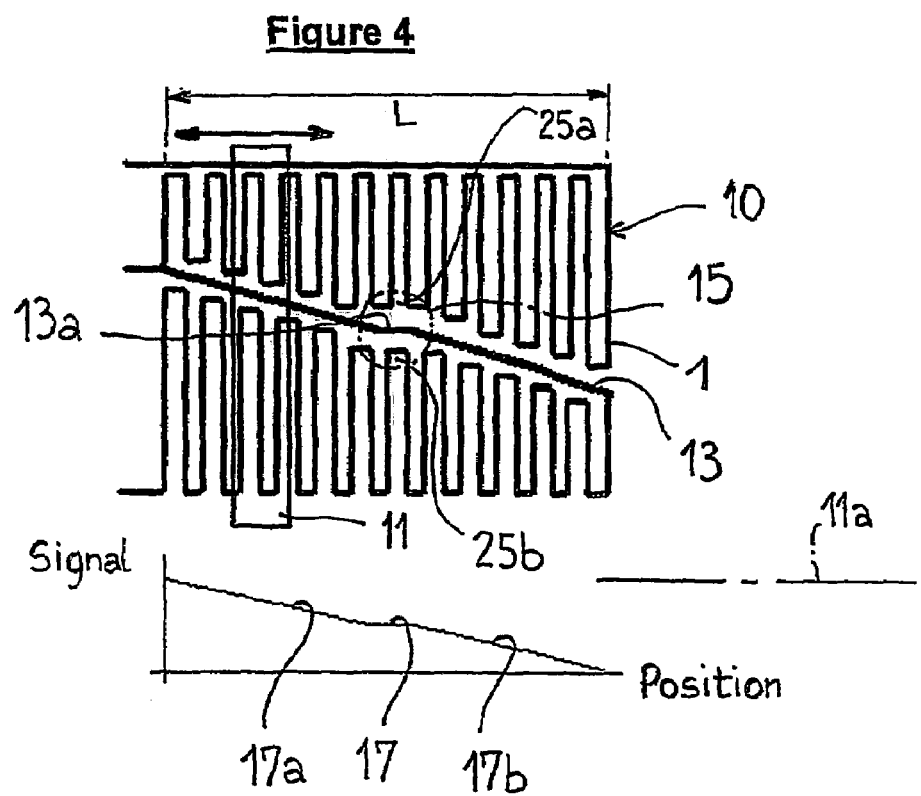

In FIG. 4, the geometry of the resistive track 1 has been modified in the central part, where a flat has been created at the center, this flat appearing both on the inclined central segment 13 (at 13a) and, on each side of the place where the upper and lower adjacent crenellations occur, respectively 25a and 25b for both of them, a certain number of successive adjacent crenellations (here, three on each side) having the same area subjected to the effect of the magnet.

Thus, it is possible to obtain a flat, at 17, on the curve $U_2=f(L)$ shown in the bottom of FIG. 4, this horizontal part of the curve making it possible, by comparison with the upstream slope 17a and downstream slope 17b respectively, both being constants, to identify a particular position, such as here a central position, of the magnet relative to the general area 10.

More generally, it will be possible to obtain the curve of choice, according to the geometry of the resistive track 1 and the position of this geometric change along this track, by therefore adapting the variation in density of the conductor.

Figure 5:
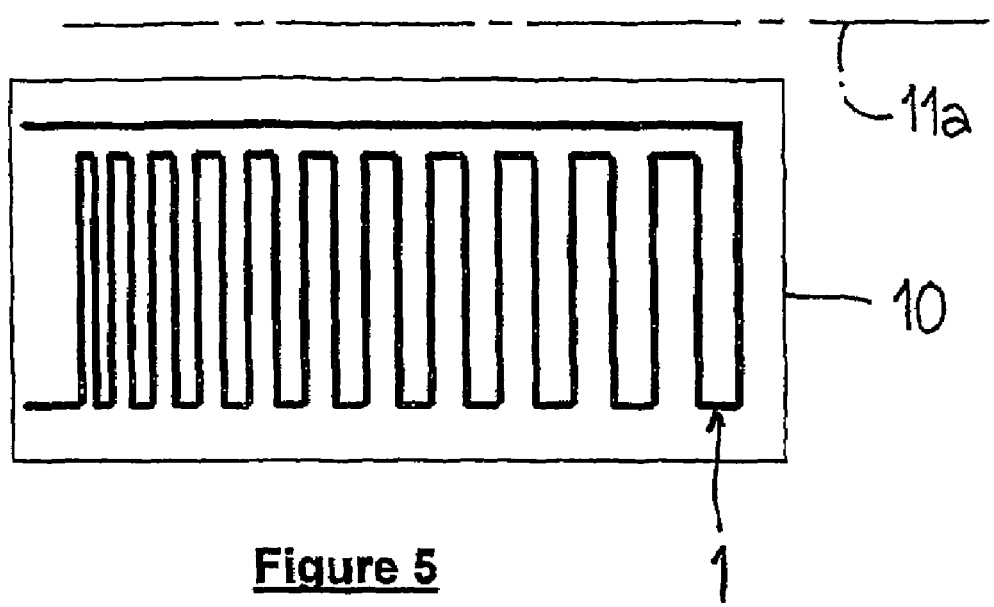

FIGS. 3 and 5 show two other geometrical shapes of the conducting track area 10 that are produced on the basis of a variation in density of the electrical conductor 1 subjected to the magnetic effect of the magnet, namely a crenellated and generally triangular shape in FIG. 3, and a crenellated shape with the gap between crenellations decreasing in one direction, along the direction of displacement 11a, in FIG. 5.

It will also be possible, as indicated earlier, to work, complementarily or alternatively, on the cross section of the electrical conductor 1, by increasing it or reducing it depending on whether it is desired to increase or reduce the signal in response, coupled with the effect produced by the moving magnet.

In FIG. 3 it may be seen that the angle of inclination $\alpha$ between the direction 19a perpendicular to the axis of displacement 11a of the magnet 11 and the direction 19b parallel to which most (here, all) the lateral sides, such as 21 and 23 of the crenellations formed by the conductor 1 in the area 10 lie, where $0°<\alpha<90°$.

Here, the angle $\alpha$ ranges from about 2° to 10°.

Since the other segments, namely the bottom and end segments such as 25 and 27, of this conducting track area are parallel or approximately parallel to the axis of displacement 11a, there will therefore be predominantly, or in this case exclusively, a conducting track area having portions such as 21, 23, 25, 27 that are not perpendicular to the direction of displacement 11a of the magnet.

The effect obtained is to smooth the curve resulting from the measurement, which would exhibit otherwise, i.e. for a zero value of $\alpha$, small jumps along the curve.

Also to enhance the sensitivity of the measurements, with a controlled cost, the magnet 11 may be favorably provided with pole pieces 29a, 29b as shown in FIG. 2, these being located on either side of its sides transverse to the axis of displacement 11a.

In FIGS. 6, 7 and 8, the position sensor of the invention is used for measuring rotational displacements, such as for example in FIG. 6 at the shaft end 12, with here a square pattern of the resistive track area 10 and a rectangular magnet 11, but it is possible for the geometry of the area 10 to correspond to that of FIG. 4, over a square area and not a rectangular area.

It is thus possible to obtain a variation in cos θ and sin θ, from which it is possible to extract the angle θ, from the formula θ=arctan(sin θ/cos θ).

FIGS. 7 and 8 show, respectively, two conducting tracks corresponding to the electrical conductors 30 and 31.

To define the sensitive area 10, each conductor 30, 31 is wound so as to have, on the outside, segments 30a, 30b; 31a, 31b respectively, for both of them in each case, these segments following substantially a spiral, as may be seen. Furthermore, it is facing this spiral that the magnet will rotate, in order to obtain the desired magnetoresistive sensor here.

The invention claimed is:

1. A method of sensing position employing magnetoimpedance on a contactless position sensor, the method comprising:
    subjecting a portion of an electrical conductor, said electrical conductor having a first end, a second end, and a magnetically sensitive surface, to a magnetic effect of a permanent magnet, an area of the surface of said portion subjected to said magnetic effect varying with a relative position of the magnet with respect to the conductor;
    varying said relative position of the magnet wherein the magnet partially or completely eliminates a skin effect occurring in an affected area of the portion, and causing an impedance of the electrical conductor to vary; and
    recording said variation of said impedance obtained during said varying step, said variation being in correlation with the position of the magnet.

2. The method according to claim 1, wherein,
    the electrical conductor is subjected to an AC voltage, and
    recording said variation of said impedance comprises recording a variation of electrical resistance generated by said variation in said relative position.

3. The method according to claim 2, wherein the AC voltage alternates between a few kHz and less than 1000 MHz.

4. The method according to claim 3, wherein the AC voltage alternates between a few kHz and less than 100 MHz.

5. The method according to claim 4, wherein the AC voltage alternates between 5 kHz and 50 MHz.

6. The method according to claim 1, wherein,
    said electrical conductor has a first cross-sectional area at said first end, and a second cross-sectional area at said second end, said second cross-sectional area being greater than said first cross-sectional area.

7. The method according to claim 6, wherein,
    the density of the electrical conductor subjected to the magnetic effect of the magnet increases from a minimum density at said first end to a maximum density at said second end.

8. The method according to claim 1, wherein,
    the density of the electrical conductor subjected to the magnetic effect of the magnet increases from a minimum density at said first end to a maximum density at said second end.

9. The method according to claim 1, wherein,
    the conductor has segments arranged along a substantially spiral curve; and
    during the varying step, a relative rotation is imposed between the magnet and said spiral curve, said magnet and said conductor facing each other.

10. The method according to claim 1, wherein said electrical conductor is a continuous electrical path from the first end to the second end.

11. A position sensor, comprising:
    a conducting track area, comprised of an electrical conductor, having a surface sensitive to a magnetic field and at least two terminals;
    a permanent magnet configured to generate said magnetic field on the surface;
    a power source configured to create an AC voltage across said terminals of the conducting track area;
    displacement means for varying a relative position between the magnet and the sensitive surface; and
    recording means for recording at least one of i) an electrical resistance of the conducting track area and ii) a variation of said electrical resistance generated by said varying of said relative position,
    wherein said varying of said relative position causes the magnet to partially or completely eliminate a skin effect occurring in an affected area of the surface.

12. The position sensor as claimed in claim 11, wherein the electrical conductor comprises one of a paramagnetic material and a ferromagnetic material.

13. The sensor as claimed in claim 12, wherein,
    the magnet is movable with respect to the sensitive surface along a displacement direction (11a); and
    the conducting track area has, predominantly or exclusively, conducting track portions that are not perpendicular to the direction (11a) of displacement of the magnet.

14. The sensor as claimed in claim 12, wherein, the magnet is provided with pole pieces configured to concentrate the magnetic field.

15. The sensor as claimed in claim 11, wherein,
    the magnet is movable with respect to the sensitive surface along a displacement direction (11a); and
    the conducting track area has, predominantly or exclusively, conducting track portions that are not perpendicular to the direction (11a) of displacement of the magnet.

16. The sensor as claimed in claim 15, wherein, the magnet is provided with pole pieces configured to concentrate the magnetic field.

17. The sensor as claimed in claim 11, wherein, the magnet is provided with pole pieces configured to concentrate the magnetic field.

18. The position sensor according to claim 11, wherein,
    the conducting track area has two terminals, and
    the conducting track area forms a single electrically conductive circuit continuous between a first of the two terminals and a second of the two terminals.

19. The position sensor according to claim 11, wherein,
    the electrical conductor has a first cross-sectional area at a first end of the conducting track area, and a second cross-sectional area at a second end the conducting track area, said second cross-sectional area being greater than said first cross-sectional area.

20. The position sensor according to claim 11, wherein,
    the density of the electrical conductor subjected to the magnetic field increases from a minimum density at a first end of the conducting track area to a maximum density at a second end the conducting track area.

* * * * *